(12) United States Patent
Bellezza Quater et al.

(10) Patent No.: US 7,510,205 B2
(45) Date of Patent: Mar. 31, 2009

(54) SEMITRAILER FOR ARTICULATED LORRIES WITH ADJUSTABLE-HEIGHT LOADING PLATFORM

(75) Inventors: Giorgio Bellezza Quater, Lombardore (IT); Paolo Bellezza Quater, San Maurizio Canavese (IT); Silvia Bellezza Quater, San Maurizio Canavese (IT)

(73) Assignee: A.R.I.S. S.p.A., Lombardore (IT)

( * ) Notice: Subject to any disclaimer, the term of this patent is extended or adjusted under 35 U.S.C. 154(b) by 496 days.

(21) Appl. No.: 11/444,379

(22) Filed: Jun. 1, 2006

(65) Prior Publication Data

US 2006/0279066 A1 Dec. 14, 2006

(30) Foreign Application Priority Data

Jun. 10, 2005 (IT) .......................... TO2005A0399

(51) Int. Cl.
*B62D 53/02* (2006.01)
(52) U.S. Cl. .................... 280/492; 280/430; 280/441.2; 280/425.2; 280/493
(58) Field of Classification Search ................. 280/492, 280/493, 504, 441.2, 452.2, 430, 483, 489, 280/781, 789
See application file for complete search history.

(56) References Cited

U.S. PATENT DOCUMENTS

| | | | | |
|---|---|---|---|---|
| 3,334,912 A | * | 8/1967 | Mauck | ........................ 280/81.6 |
| 4,856,804 A | * | 8/1989 | Nash | ........................... 280/430 |
| 5,112,182 A | * | 5/1992 | Nuttall | ........................ 414/481 |
| 5,249,911 A | * | 10/1993 | Marola | ........................ 414/563 |
| 5,853,283 A | * | 12/1998 | Grant | .......................... 414/563 |
| 5,882,027 A | | 3/1999 | Tevis et al. | |
| 6,012,724 A | * | 1/2000 | Pitkanen | ................... 280/6.155 |
| 6,036,428 A | * | 3/2000 | Kooima | ....................... 414/563 |
| 6,371,505 B1 | * | 4/2002 | Turner, II | ................. 280/441.2 |
| 6,942,232 B1 | * | 9/2005 | McGhie | ................ 280/124.112 |
| 2002/0145267 A1 | * | 10/2002 | Boon | ....................... 280/441.2 |
| 2004/0084874 A1 | * | 5/2004 | McDougall et al. | ....... 280/441.2 |
| 2006/0087099 A1 | * | 4/2006 | Marola | ..................... 280/441.2 |

FOREIGN PATENT DOCUMENTS

| | | |
|---|---|---|
| FR | 1 387 587 A | 1/1965 |
| SU | 1 098 858 A1 | 6/1984 |
| WO | WO 01/45971 A | 6/2001 |

* cited by examiner

*Primary Examiner*—Paul N Dickson
*Assistant Examiner*—Tashiana Adams
(74) *Attorney, Agent, or Firm*—Modiano & Associati; Daniel J. O'Byrne; Albert Josif

(57) ABSTRACT

The semitrailer is joinable to a tractor provided with a vertical towing gudgeon, is supported at its back end by a wheeled structure, and comprises a chassis having longitudinal members and crosspieces, which define a horizontal loading platform, and further having uprights rising from its forward end. A towing bar is hinged on the uprights around a first horizontal and transversal hinging axis. A compensating hydraulic cylinder is articulated between the chassis and the towing bar. A coupling is articulated to the towing bar forwardly of the first axis, for hinging around a second horizontal and transversal hinging axis, and is provided with a bushing that is transversal to the second hinging axis and is rotatably engageable on the towing gudgeon of the tractor.

7 Claims, 4 Drawing Sheets

SEMITRAILER FOR ARTICULATED LORRIES WITH ADJUSTABLE-HEIGHT LOADING PLATFORM

This invention is concerned with a semitrailer for articulated lorries with adjustable-height loading platform, particularly a general-purpose semitrailer for airborne transport, such as for aircraft known commercially as C130 and the like.

In this disclosure the expression general-purpose refers to the transport of miscellaneous items such as generic machines and implements, particularly earth-moving machines, trestles and other structures, as well as the transport of containers, railway cars and the like.

BACKGROUND OF THE INVENTION

IT-236 083 discloses a lorry for general-purpose transport comprising a main chassis provided with a loading platform and with an auxiliary chassis acting as a tractor, which is frontally articulated to the main chassis, while maintaining the ability to swing around a transverse axis as well as around a longitudinal axis, against the bias of active suspension means. Due to its structure, the lorry can change the height of its loading platform with respect to the ground, e.g. so that the lorry can move easily along irregular ground with pitching and rolling, and also can maintain the loading platform horizontal when moving on a slope.

However, the flexibility of the lorry disclosed in the above-mentioned patent is limited by the circumstance that the tractor and the loading platform are not separable.

SUMMARY OF THE INVENTION

Accordingly, the main object of this invention is to provide a semitrailer that can be associated with an independent tractor in order to build an articulated lorry having an ability of articulation similar to the lorry disclosed in the above-mentioned patent, and more particularly such that its loading platform can be maintained horizontal even on steep slopes, such as are encountered during loading and unloading of transport aircraft of type C130, in which latter aircraft, as known, the loading bay has a very steep access ramp.

Another object of the invention is to provide a semitrailer having features which render it particularly suitable for use on transport aircraft of type C130, particularly with reference to the stability of the semitrailer during airborne transport.

The above object, as well as other objects and advantages such as will appear below, are achieved in a semitrailer for articulated lorries having the features recited in claim 1, the dependent claims reciting further advantageous, though accessory, features of the invention.

BRIEF DESCRIPTION OF THE DRAWINGS

The invention will now be described in more detail, with reference to a preferred though non-exclusive embodiment, shown by way of non-limiting example in the attached drawings, wherein.

DESCRIPTION OF THE PREFERRED EMBODIMENTS

Figure 1:
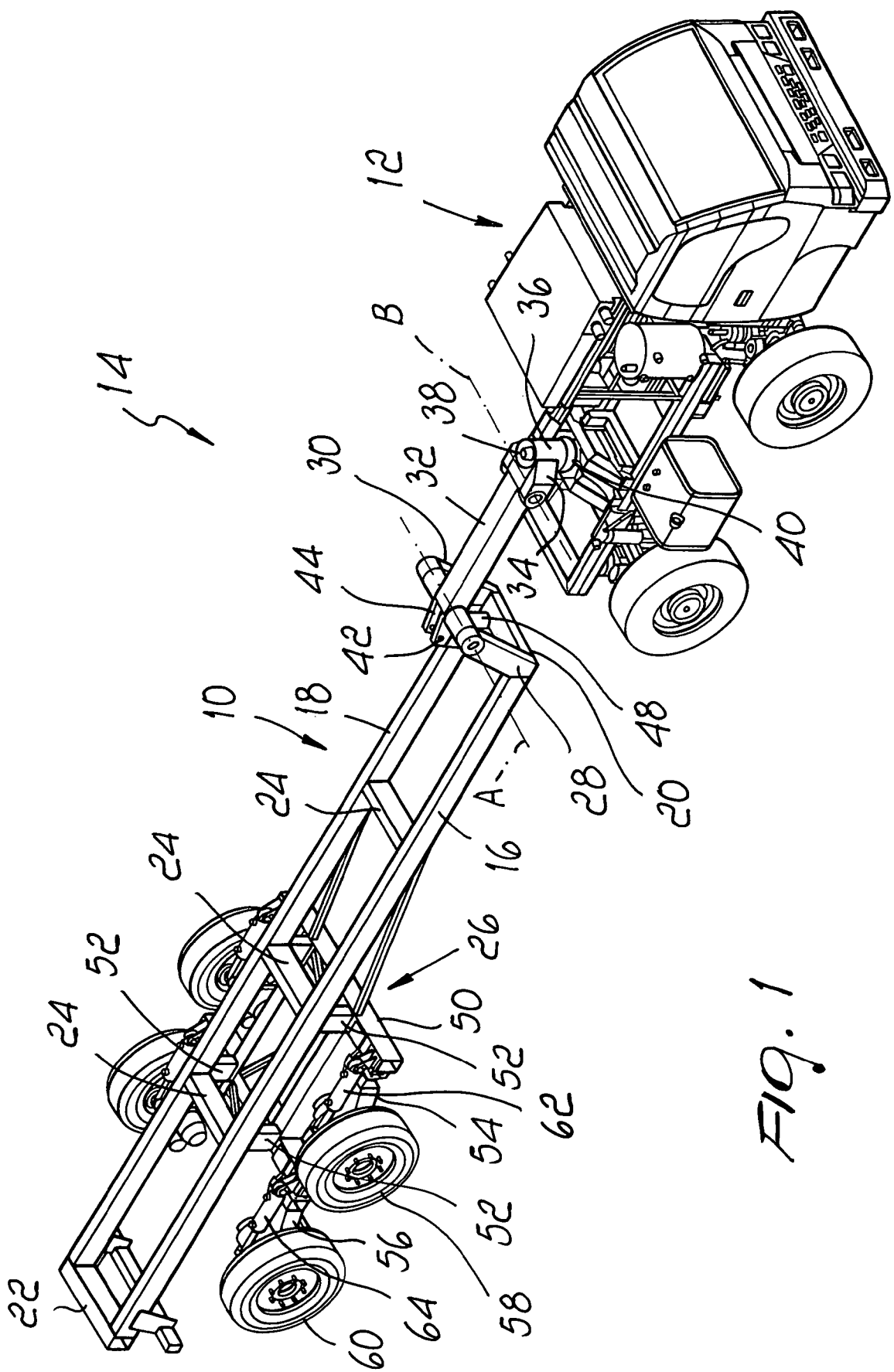
FIG. 1 is a perspective view of an articulated lorry comprising a tractor arranged for towing a semitrailer according to the invention.
Figure 2:
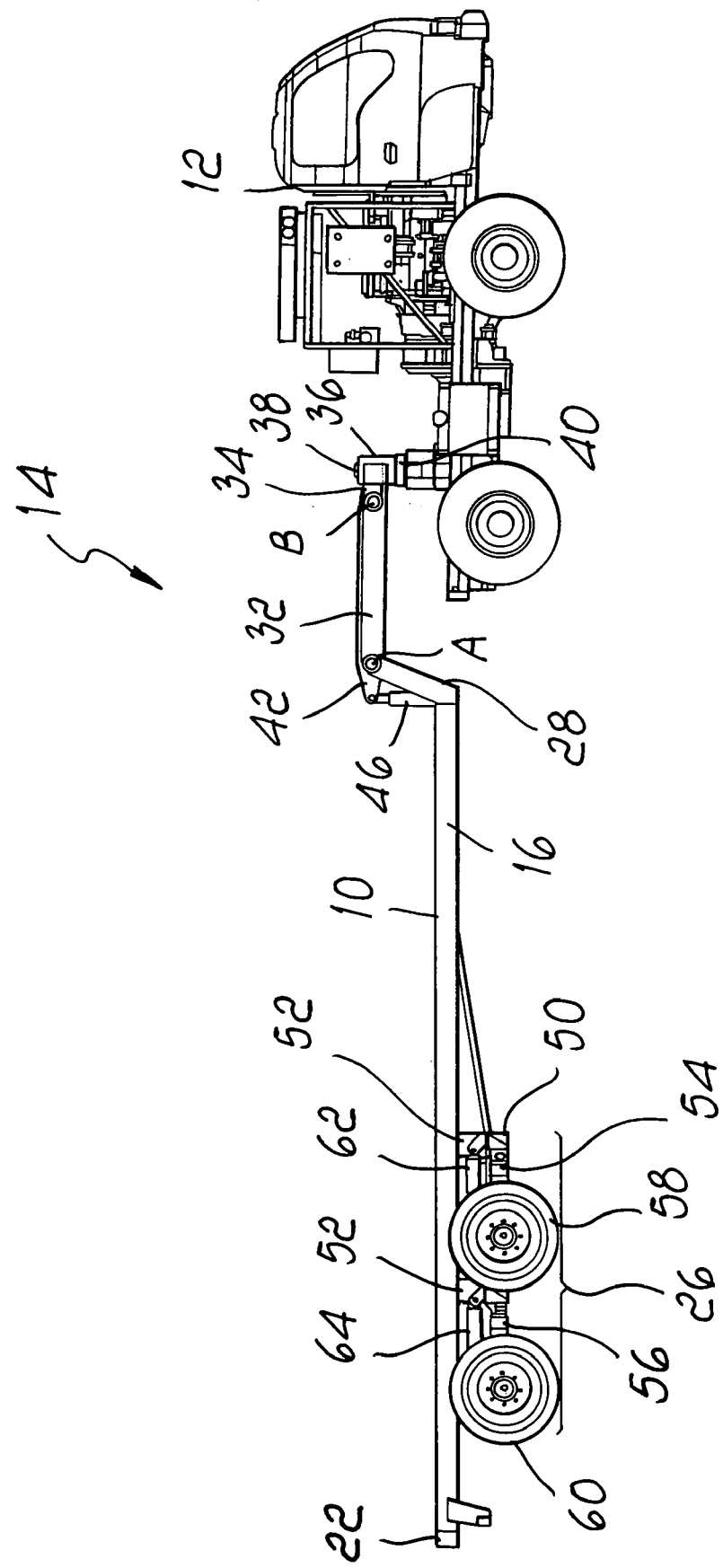
FIG. 2 is a view in side elevation of the articulated lorry of FIG. 1.

With reference to FIGS. 1 and 2, a semitrailer 10 is articulated for towing purposes to the rear end of a tractor 12, thereby forming an articulated lorry 14 together with it.

Semitrailer 10 has a chassis comprising two longitudinal side members 16, 18, which are joined by a forward-end crosspiece 20 and a rear-end crosspiece 22, respectively, as well as by a plurality of intermediate crosspieces 24. Longitudinal members 16, 18, together with crosspieces 20, 22, 24 define a generally horizontal loading platform.

The chassis is supported at its rear end by a wheeled supporting structure 26, which is described below in more detail. Longitudinal members 16, 18 have respective integral uprights 28, 30 obliquely rising from their forward ends. A towing bar 32 is hinged between the free end of uprights 28, 30 around a first horizontal and transversal hinging axis A. A coupling 34 is hinged to an end of towing bar 32, forwardly of the first hinging axis A, around a second horizontal and transversal hinging axis B. Coupling 34 has a bushing 36 that is transverse to the second hinging axis B and is rotatably engageable on a towing gudgeon 38, vertically rising from a fifth wheel 40, integral with tractor 12.

Twin noses 42, 44 project from towing bar 32, at the back of the first hinging axis A, and are joined to forward-end crosspiece 20 through a pair of compensating hydraulic cylinders 46, 48, respectively.

Figure 3:
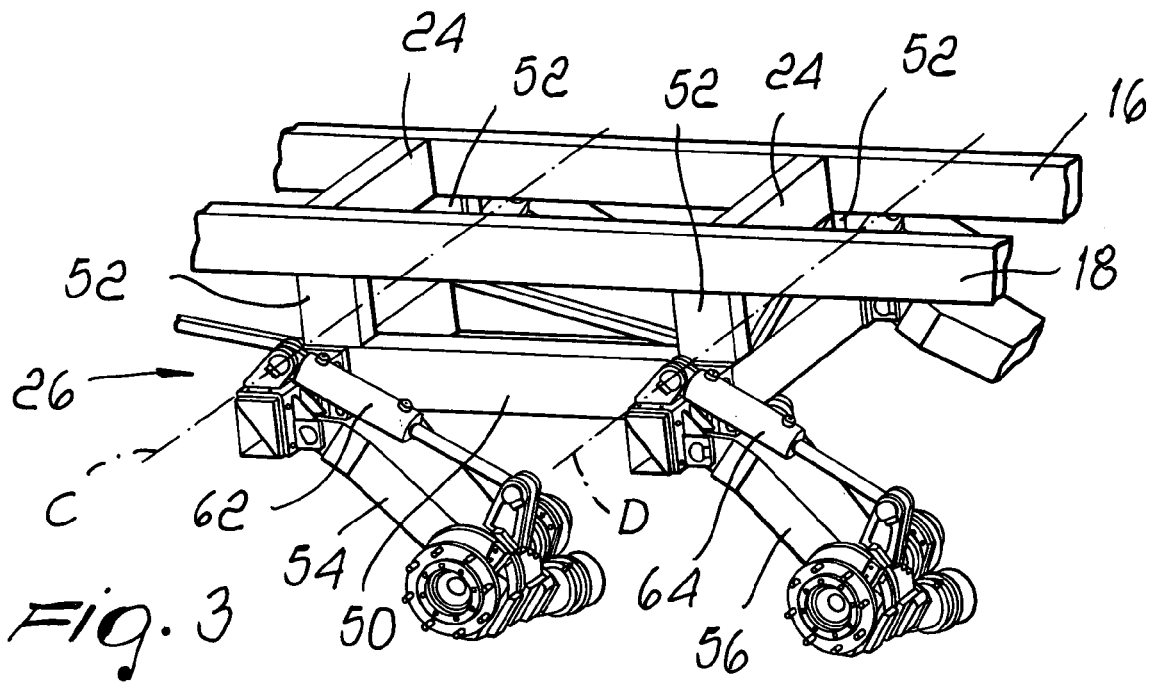
FIG. 3 is a perspective view of a detail of the articulated lorry of FIG. 1.

With reference to FIG. 3, wheeled support structure 26 has a rectangular frame 50, parallel to the loading platform and connected via four stanchions 52 to the underside of longitudinal members 16, 18. On each side of frame 50, two suspension arms 54, 56 are articulated around respective spaced horizontal and transversal suspension axes C, D. At the free ends of suspension arms 54, 56 are mounted respective wheels 58, 60 (removed in FIG. 3 for clarity of illustration). A pair of hydropneumatic suspension cylinders 62, 64 have one end articulated to a respective suspension arm 54, 56, slightly above the pivoting area of the wheel, and its end opposite to frame 50 slightly above the suspension axis of the respective arm.

Figure 4:
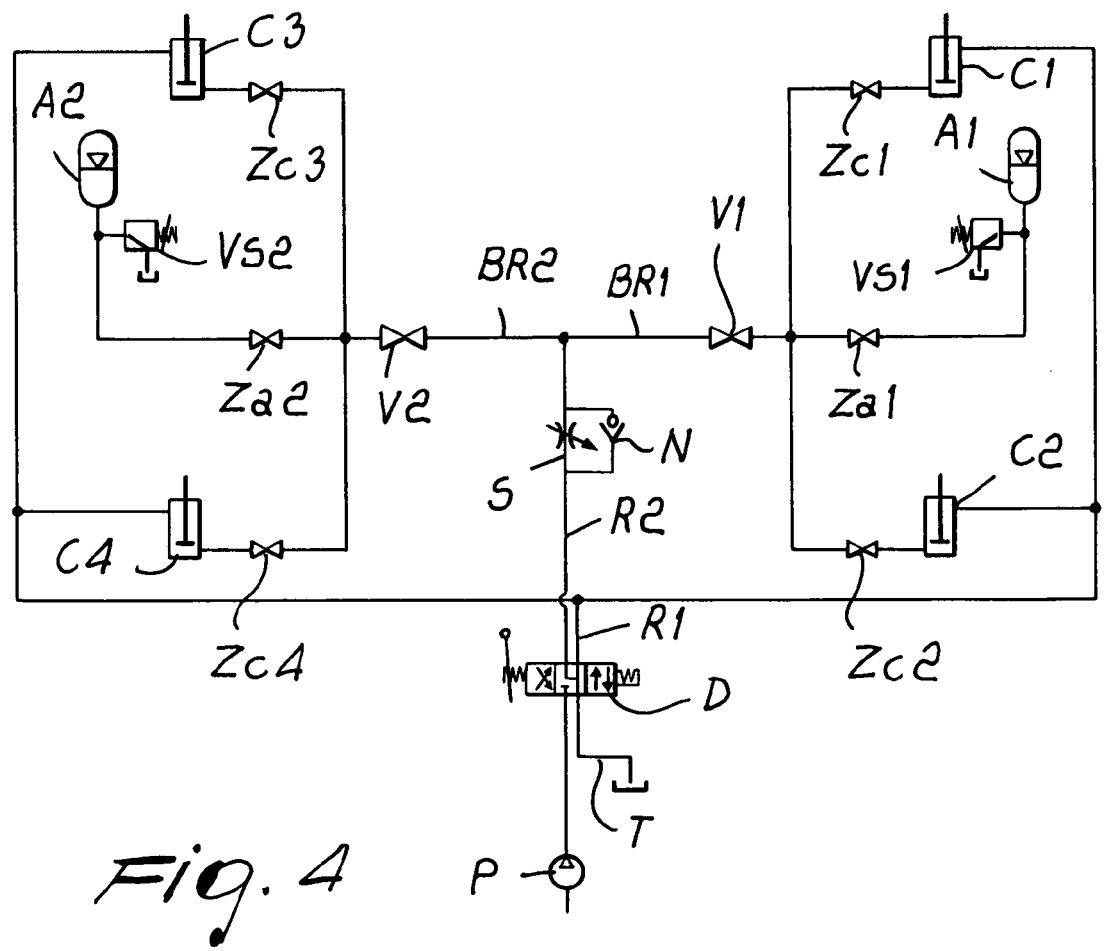
FIG. 4 is a functional diagram of an oleo-dynamic circuit used with the articulated lorry of FIG. 1.

The hydropneumatic cylinders are supplied by a hydraulic cylinder schematically shown in FIG. 4. In the hydraulic circuit, cylinders C1, C2, C3, C4 are connected in parallel with each other. The rod sides and the head sides of these cylinders are connected to a first and a second circuit branches R1, R2, respectively, which are themselves operatively connected to a pump P and to exhaust T via a three-way distributor D. Distributor D has a rest position in which both branches R1, R2 are connected to the exhaust, and two alternative positions in which one of both branches is connected to the pump while the other is connected to the exhaust. In the second branch R2 and downstream of distributor D, an adjustable throttle S is interposed, which is bypassed by a single-acting valve N, open to the cylinders. Downstream of throttle S, the second branch R2 is further bifurcated onto two sub-branches BR1, BR2, each of them leading to a pair of cylinders C1, C2 and C3, C4 on the same side of the semitrailer, through a respective cock V1 e V2. The head sides of the cylinders on the two sides of the semitrailer are connected to respective nitrogen accumulators A1, A2, a safety valve being connected upstream of each accumulator. In the conduit leading to the head sides of the cylinders and to the accumulators are inserted respective cocks $Zc_1$, $Zc_2$, $Zc_3$, $Zc_4$ and $Za_1$, $Za_2$, which are controllable to individually isolate the cylinders and the accumulators, respectively, e.g. for maintenance, replacement, or for special maneuvers.

Figure 5:
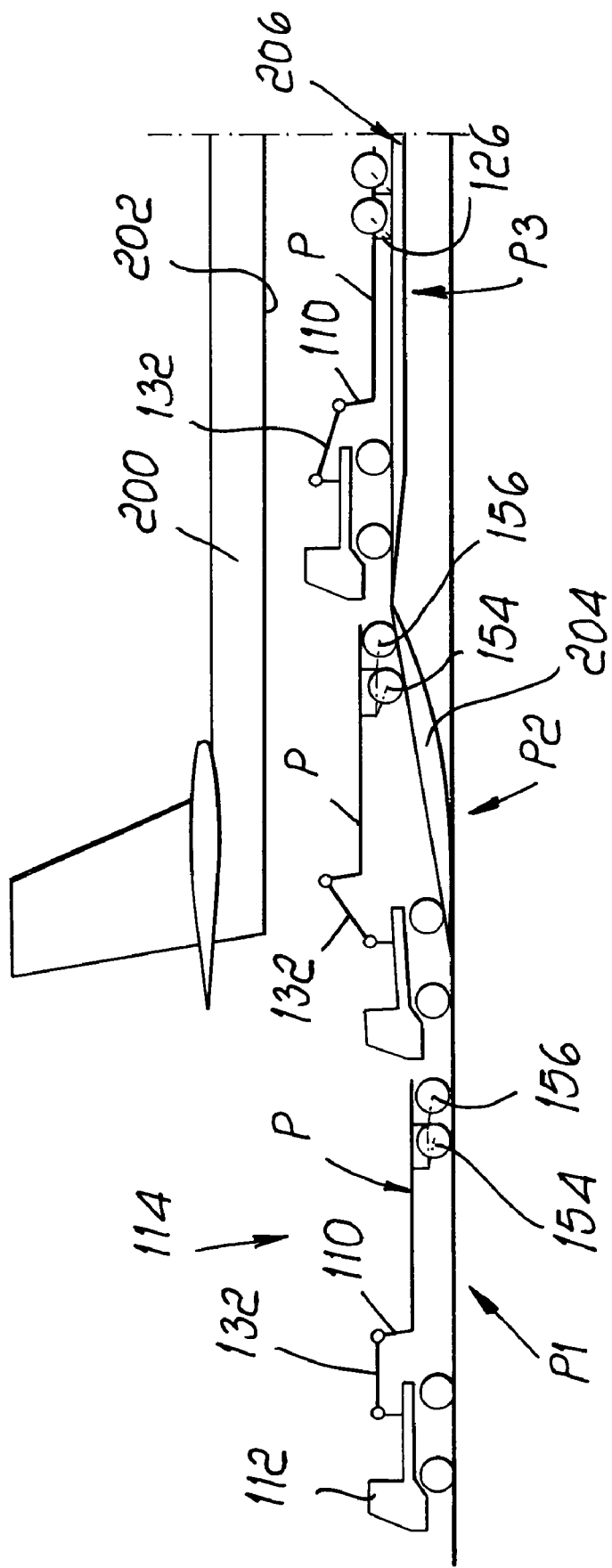
FIG. 5 schematically shows the articulated lorry with a semitrailer according to the invention, in a few successive steps of loading aboard a transport aircraft.

FIG. 5 schematically shows an articulated lorry comprising a tractor 112, frontally articulated to a semitrailer 110 according to the invention, in three successive configurations during loading aboard a generic transport aircraft 200. The aircraft has a bay 202, accessible through a back hatch 204 that can be tipped to form an access ramp. In a configuration for ordinary road travel, as shown with P1 in FIG. 5, suspension arms 154, 156 of semitrailer 110 are parallel to each other, while the towing bar 132 is parallel to the loading platform P of the semitrailer, so that the latter is maintained parallel to the ground. If it is desired to change the height of the loading platform from the ground, e.g. increase the height for an easier running on rough ground, the suspension cylinders 62, 64 are operated so that the inclination of suspension arms 154, 156 with respect to the ground is increased, thereby raising the rear end of the semitrailer. At the same time, the compensating pneumatic cylinders 46, 48 are operated, so that the towing bar 132 is inclined downwardly, thereby maintaining loading platform P paralel to the ground.

As shown in FIG. 5, an articulated lorry is usually loaded aboard a transport aircraft by moving it in reverse. In the intermediate positions on the slope, such as referenced with P2 in FIG. 5, in which the semitrailer is at a raised height with respect to the tractor, the difference is compensated by operating the suspension cylinders 62, 64 so that the towing bar 132 is inclined downwardly. On the other hand, the relative inclination of loading platform P with respect to ramp 204 is compensated by lowering the front wheels of the semitrailer and correspondingly raising the rear wheels, these adjustments being achieved by swiveling the respective suspension arms 154 e 156 in opposite directions. This coordinated movement of the suspension arms is made possible by the parallel connection of the respective cylinders, with passage of liquid from the head sides of the front cylinders to the head sides of the rear cylinders. As persons skilled in the art will appreciate, this passage will evenly distribute the load on all the wheels of the semitrailer, even during movement on the ramp, the loading platform being kept horizontal, so that rear-wheel overloads are avoided. Obviously, if the slope is taken in the opposite direction, a similar compensation will take place so that overloads are avoided on the front wheels.

Finally, in the rest configuration shown with P3 in FIG. 5, semitrailer 110 is lowered until the bottom of its support structure 126 rests on the platform 206 of the aircraft, so that the contact surface is enhanced and consequently also the stability during the flight. In this configuration, the suspension cylinders are operated so that the wheels of the semitrailer are lifted from the ground, and the towing bar 132 is inclined upwardly, thereby keeping the loading platform of semitrailer P horizontal with respect to the floor of the aircraft.

The parallel connection among the cylinders also has the effect of compensating rolling jolts during travel, due to transfer of liquid from the head sides of the cylinders on one side of the semitrailer to the head sides of the cylinders on the opposite side of the semitrailer.

Accumulators A1, A2 fulfill the task of elastically absorbing any roughness of the ground during regular road travel.

A preferred embodiment of the invention has been disclosed, although a person skilled in the art may obviously make changes and variations, within the scope of the same inventive concept.

The disclosures in Italian Patent Application No. TO2005A000399 from which this application claims priority are incorporated herein by reference.

What is claimed is:

1. A semitrailer joinable to a tractor provided with a vertical towing gudgeon and supported at its back end by a wheeled structure, comprising:
   a chassis comprising a plurality of longitudinal members and crosspieces defining a generally horizontal loading platform, and at least one upright rising from a forward end of the chassis,
   a towing bar pivoting at the end of said upright around a first horizontal and transversal hinging axis,
   at least one compensating hydraulic cylinder articulated between the chassis and the towing bar, and
   a coupling articulated to the towing bar forwardly of the first axis, for pivoting around a second horizontal and transversal hinging axis, and provided with a bushing that is transversal to the second hinging axis and is rotatably engageable on the towing gudgeon of the tractor.

2. The semitrailer of claim 1, wherein said compensating hydraulic cylinder is articulated to a nose projecting from the towing bar rearwardly of the first hinging axis.

3. The semitrailer of claim 2, wherein said wheeled structure comprises a frame on each side of which are articulated two suspension arms provided with wheels at their free ends, and subjected to the action of respective hydropneumatic suspension cylinders having one end articulated to the suspension arm and an opposite end articulated to the frame.

4. The semitrailer of claim 3, wherein said hydropneumatic suspension cylinders are connected in parallel to each other through a hydraulic supply circuit.

5. The semitrailer of claim 4, wherein said hydraulic supply circuit comprises a first and a second circuit branch in communication with the rod sides and the head sides of the cylinders respectively, and operatively connected to a pump and to the exhaust through a distributor, and wherein the second branch, downstream of the distributor, incorporates an adjustable throttle bypassed by a single-acting valve opening to the cylinders.

6. The semitrailer of claim 5, wherein said second circuit branch, downstream of the adjustable throttle, is further branched into two sub-branches, each connected with a pair of cylinders on the same side of the semitrailer.

7. The semitrailer of claim 6, wherein said distributor has three selectable positions, comprising a rest position in which both branches are connected to exhaust, and two alternative positions in which one of both branches is connected to the pump and the other to exhaust.

* * * * *